US012048400B2

(12) United States Patent
Bullock et al.

(10) Patent No.: US 12,048,400 B2
(45) Date of Patent: *Jul. 30, 2024

(54) BULK REFILL PROTECTION SENSOR FOR DISPENSING SYSTEM

(71) Applicant: GOJO Industries, Inc., Akron, OH (US)

(72) Inventors: Mark Bullock, Wooster, OH (US); Scott Proper, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,868

(22) Filed: Apr. 19, 2023

(65) Prior Publication Data

US 2023/0248186 A1 Aug. 10, 2023

Related U.S. Application Data

(63) Continuation of application No. 17/371,591, filed on Jul. 9, 2021, now Pat. No. 11,659,965, which is a continuation of application No. 15/211,582, filed on Jul. 15, 2016, now Pat. No. 11,058,261.

(60) Provisional application No. 62/192,835, filed on Jul. 15, 2015.

(51) Int. Cl.
*A47K 5/12* (2006.01)
*B05B 12/08* (2006.01)

(52) U.S. Cl.
CPC .......... *A47K 5/1217* (2013.01); *A47K 5/1211* (2013.01); *B05B 12/08* (2013.01)

(58) Field of Classification Search
CPC ................... G05D 9/00; G05D 7/0617; B67D 2001/1263; B67D 2001/1261; B67D 2001/1259; B67D 1/0871; G06K 19/07798; A47K 5/1217; A47K 5/1211; B05B 12/08
See application file for complete search history.

(56) References Cited

U.S. PATENT DOCUMENTS

| | | | |
|---|---|---|---|
| 3,581,998 | A | 6/1971 | Roche |
| 3,963,063 | A | 6/1976 | Pascarella |
| 4,090,525 | A | 5/1978 | Potter |
| 4,173,858 | A | 11/1979 | Cassia |
| 4,313,477 | A | 2/1982 | Sebalos |
| 4,322,019 | A | 3/1982 | Smith |
| 4,615,362 | A | 10/1986 | Hartman et al. |
| 4,682,734 | A | 7/1987 | Proctor et al. |
| 4,807,675 | A | 2/1989 | Sharp |

(Continued)

FOREIGN PATENT DOCUMENTS

| | | | |
|---|---|---|---|
| DE | 29707536 | U1 | 10/1998 |
| DE | 19948462 | A1 | 9/2000 |
| WO | 2009063471 | A2 | 5/2009 |

*Primary Examiner* — Frederick C Nicolas
*Assistant Examiner* — Robert K Nichols, II
(74) *Attorney, Agent, or Firm* — Calfee, Halter & Griswold LLP

(57) ABSTRACT

An exemplary dispensing system includes a dispenser, an actuator, a sensor, and a controller. The dispenser includes a container for holding liquid, a liquid pump, an air pump, an outlet nozzle, and a foaming media. The actuator causes the dispenser to dispense liquid or foam. The sensor generates an input signal indicative of a status of the container. The controller receives the input signal, generates at least one output signal, and prevents the dispenser from dispensing liquid or foam if a breach is detected in the container.

20 Claims, 3 Drawing Sheets

(56) References Cited

U.S. PATENT DOCUMENTS

| | | | |
|---|---|---|---|
| 5,018,558 | A | 5/1991 | Sharp |
| 5,088,530 | A | 2/1992 | Harp |
| 5,226,566 | A | 7/1993 | Brandenburg |
| 5,390,713 | A | 2/1995 | Fiech |
| 5,392,827 | A | 2/1995 | Yasso et al. |
| 5,474,112 | A | 12/1995 | Carola |
| 5,540,362 | A | 7/1996 | Azuma et al. |
| 5,586,586 | A | 12/1996 | Fiech |
| 5,632,414 | A | 5/1997 | Merriweather |
| 5,829,681 | A | 11/1998 | Hamel et al. |
| 6,000,626 | A | 12/1999 | Futo et al. |
| 6,142,342 | A | 11/2000 | Lewis |
| 6,345,738 | B1 | 2/2002 | Brozell et al. |
| 6,371,386 | B1 | 4/2002 | Hoy |
| 6,467,651 | B1 | 10/2002 | Muderlak et al. |
| 6,651,851 | B2 | 11/2003 | Muderlak et al. |
| 6,749,135 | B2 | 6/2004 | Groblebe et al. |
| 6,929,150 | B2 | 8/2005 | Muderlak et al. |
| 7,228,874 | B2 | 6/2007 | Bolderheij et al. |
| 7,364,053 | B2 | 4/2008 | Ophardt |
| 7,455,197 | B2 | 11/2008 | Ophardt |
| 7,527,174 | B2 | 5/2009 | Meehan et al. |
| 7,533,787 | B2 | 5/2009 | Muderlak et al. |
| 7,611,317 | B2 | 11/2009 | Muderlak et al. |
| 7,647,653 | B1 | 1/2010 | Catania |
| 7,753,087 | B2 | 7/2010 | Rhodenbaugh et al. |
| 7,798,370 | B2 | 9/2010 | Ciavarella et al. |
| 7,815,074 | B2 | 10/2010 | Ciavarella et al. |
| 7,950,548 | B2 | 5/2011 | Ciavarella et al. |
| 8,051,507 | B2 | 11/2011 | Lin |
| 8,100,299 | B2 | 1/2012 | Phelps et al. |
| 8,251,110 | B2 | 8/2012 | Bassett et al. |
| 8,256,472 | B2 | 9/2012 | De Vries et al. |
| 8,261,950 | B2 | 9/2012 | Cittadino et al. |
| 8,371,474 | B2 | 2/2013 | Tramontina et al. |
| 8,579,157 | B2 | 11/2013 | Bem et al. |
| 8,800,815 | B1 | 8/2014 | Butler et al. |
| 8,863,992 | B2 | 10/2014 | Wing et al. |
| 8,893,928 | B2 | 11/2014 | Proper |
| 8,950,628 | B2 | 2/2015 | Muderlak et al. |
| 9,437,103 | B2 | 9/2016 | Ophardt |
| 9,681,779 | B2 | 6/2017 | Babikian et al. |
| 9,681,780 | B2 | 6/2017 | Ciavarella et al. |
| 9,913,562 | B2 | 3/2018 | Wegelin et al. |
| 10,034,584 | B2 | 7/2018 | Ciavarella et al. |
| 10,189,698 | B2 | 1/2019 | Proper et al. |
| 10,358,335 | B2 | 7/2019 | Proper et al. |
| 10,716,436 | B2 | 7/2020 | Ciavarella et al. |
| 10,974,951 | B2 | 4/2021 | Proper et al. |
| 11,058,261 | B2 | 7/2021 | Bullock et al. |
| 11,122,939 | B2 | 9/2021 | Ciavarella et al. |
| 2002/0185500 | A1 | 12/2002 | Muderlak et al. |
| 2004/0011807 | A1 | 1/2004 | Knepler |
| 2004/0050876 | A1 | 3/2004 | Muderlak et al. |
| 2005/0205612 | A1 | 9/2005 | Muderlak et al. |
| 2005/0218161 | A1 | 10/2005 | Muderlak et al. |
| 2006/0011655 | A1 | 1/2006 | Ophardt |
| 2007/0084521 | A1 | 4/2007 | Rhodenbaugh et al. |
| 2007/0204925 | A1 | 9/2007 | Bolderheij et al. |
| 2008/0185399 | A1 | 8/2008 | Yang et al. |
| 2009/0084813 | A1 | 4/2009 | Chen |
| 2009/0101671 | A1 | 4/2009 | Cittadino et al. |
| 2011/0127291 | A1 | 6/2011 | Tramontina et al. |
| 2011/0131714 | A1 | 6/2011 | Remijn et al. |
| 2011/0215115 | A1 | 9/2011 | Proper |
| 2012/0048420 | A1 | 3/2012 | Martin |
| 2013/0075420 | A1 | 3/2013 | Tramontina et al. |
| 2014/0124540 | A1 | 5/2014 | Ciavarella et al. |
| 2014/0253336 | A1 | 9/2014 | Ophardt |
| 2014/0263421 | A1 | 9/2014 | Urban et al. |
| 2014/0263427 | A1 | 9/2014 | Muderlak et al. |
| 2014/0263430 | A1 | 9/2014 | Keating et al. |
| 2015/0083748 | A1 | 3/2015 | Mchale et al. |
| 2015/0223646 | A1 | 8/2015 | Wegelin et al. |
| 2015/0230668 | A1 | 8/2015 | Shakkour et al. |
| 2016/0184851 | A1 | 6/2016 | Mcnulty et al. |
| 2016/0316975 | A1 | 11/2016 | Ophardt |
| 2017/0112329 | A1 | 4/2017 | Babikian |
| 2017/0190565 | A1 | 7/2017 | Proper et al. |
| 2018/0078958 | A1 | 3/2018 | Ophardt et al. |
| 2021/0330137 | A1 | 10/2021 | Bullock et al. |

BULK REFILL PROTECTION SENSOR FOR DISPENSING SYSTEM

RELATED APPLICATIONS

This application is a continuation of U.S. application Ser. No. 17/371,591, filed on Jul. 9, 2021, which is a continuation of U.S. application Ser. No. 15/211,582, filed on Jul. 15, 2016, now U.S. Pat. No. 11,058,261, which claims priority to and the benefits of U.S. Provisional Application No. 62/192,835, filed on Jul. 15, 2015 and titled BULK REFILL PROTECTION SENSOR FOR DISPENSING SYSTEM, all of which are incorporated herein by reference in their entireties.

TECHNICAL FIELD

The present invention relates generally to liquid dispenser systems, such as liquid soap and sanitizer dispensers and bulk refill units.

BACKGROUND OF THE INVENTION

Liquid dispensing systems, such as liquid soap and sanitizer dispensers, provide a user with a predetermined amount of liquid or foam upon actuation of the dispenser. Liquid dispensing systems typically have a container for holding dispensable liquid. The container is typically sealed to prevent contaminants from entering the dispensing system, thereby maintaining the system in a sanitary condition. To maintain the sanitary condition of the system, empty containers are disposed of and new containers are installed in the dispenser. The system may become contaminated, however, if the seal of the container is breached, for example, to refill the container with liquid rather than installing a new, sealed, container. In some refillable systems, bulk refill units are used to fill one or more refillable sensors. However, such systems may be prone to growing bacteria in either the bulk refill or the refillable dispenser if the bulk refill is not maintained in a sanitary condition, which may occur if someone attempts to refill the sealed bulk refill.

SUMMARY

Exemplary embodiments of liquid dispensing systems are disclosed herein.

In one exemplary embodiment, a dispensing system includes a container for holding fluid, a fluid pump for pumping fluid from the container, and an outlet nozzle. An actuator is included that causes the dispenser to dispense fluid. A sensor monitors the integrity of the container. A controller receives a signal from the sensor and generates at least one output signal. The at least one output signal includes a breach signal that is indicative of a breach in the integrity of the container.

In another exemplary embodiment, a dispensing system includes a dispenser having a refill unit and a housing with a receptacle for receiving the refill unit. The refill unit includes a container for holding fluid. An actuator causes the dispenser to dispense fluid from the container. The dispensing system also includes a sensor and a controller. The sensor generates an input signal indicative of the integrity of the container of the refill unit. The controller receives the signal from the sensor and generates at least one output signal indicating whether or not the integrity of the container has been breached.

An exemplary method for controlling a dispensing system comprises receiving an instruction to dispense fluid, receiving an input signal from a sensor for monitoring the integrity of a container, dispensing fluid if the input signal from the sensor indicates that the container has not been breached, and not dispensing fluid if the input signal from the sensor indicates that the container has been breached.

BRIEF DESCRIPTION OF THE DRAWINGS

These and other features and advantages of the present invention will become better understood with regard to the following description and accompanying drawings in which.

DETAILED DESCRIPTION

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both interfacing with a third device, such as, for example, a CPU, are in circuit communication.

Also, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal," as used herein includes, but is not limited to one or more electrical signals, analog or digital signals, one or more computer instructions, a bit or bit stream, or the like.

"Logic," synonymous with "circuit" includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions.

Values identified in the detailed description are exemplary and they are determined as needed for a particular system. Accordingly, the inventive concepts disclosed and claimed herein are not limited to the particular values or ranges of values used to describe the embodiments disclosed herein.

Figure 1:
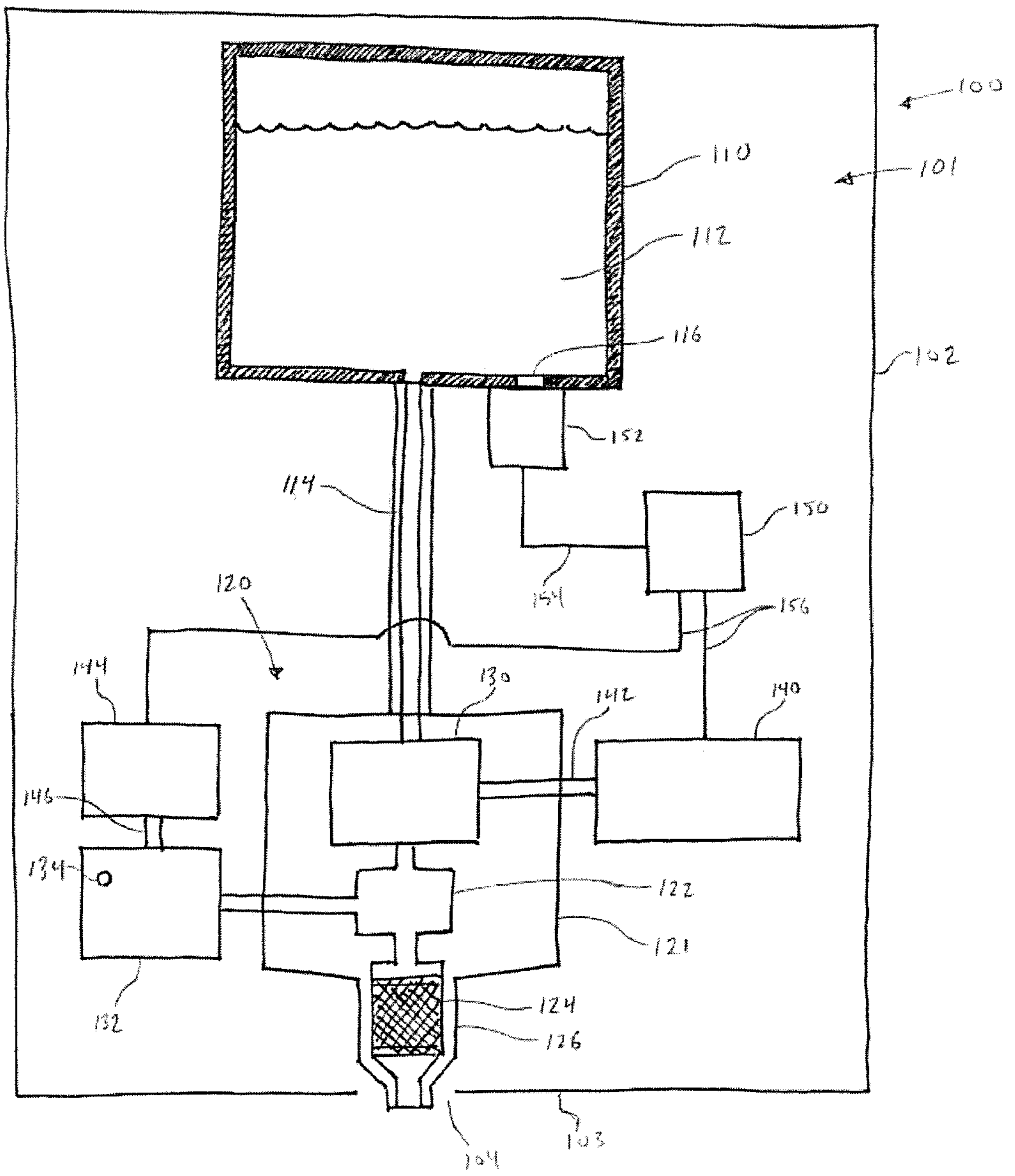
FIG. 1 is a schematic diagram of an exemplary dispensing system.

FIG. 1 illustrates an exemplary embodiment of a foam dispensing system 100. The foam dispensing system 100 includes a housing 102, a container 110, a foam pump 120 comprising a liquid pump 130 and an air pump 132, a liquid pump actuator 140, an air pump actuator 144, a controller 150, and a sensor 152. Although a foam dispensing system is shown and describe, the system may be a liquid dispensing system that dispenses liquid in the form of a liquid, i.e. without adding air to create a foam. The foam dispensing system 100 may be a wall-mounted system, a counter-mounted system, an un-mounted portable system movable from place to place, or any other kind of dispenser system. As used herein, actuator or actuating members or mechanism includes one or more parts that cause the dispensing system 100 to move liquid, air or foam.

The container 110 forms a liquid reservoir that contains a supply of dispensable liquid 112. In various embodiments, the contained liquid could be for example a soap, sanitizer, a cleanser, a disinfectant, a foamable liquid, or some other dispensable liquid. The container 110 may advantageously be refillable, replaceable or both refillable and replaceable. In the exemplary dispensing system 100, the container 110 is a non-collapsible container and can be made of thin plastic. A non-collapsing container usually includes a vent (not shown) to vent the container. In other embodiments, the container 110 may be a collapsible container made of a thinner plastic than its non-collapsible counterpart, or a flexible bag-like material.

An optional housing 102 of the dispensing system 100 may contain all components of the system, or may enclose only some components of the system 100. For example, the container 110 may be outside of the housing 102 so that it is exposed to ambient light and is visible to the user. In some other embodiments, multiple housings may enclose various combinations of components of the system 100. The container 110 may be located separate from the dispenser housing 102, and may, for example, rest on the floor.

In various embodiments, the dispensing system 100 includes a disposable refill unit 101 that includes the container 110. In some embodiments, the refill unit 110 includes the foam pump 120. Although the embodiments disclosed herein show and describe a foam pump, other embodiments include liquid pumps without the air pumps or foam cartridge.

In the event the liquid stored in the container 110 of the installed disposable refill unit 101 runs out, or the installed refill unit 101 otherwise has a failure, the installed refill unit 101 may be removed from the dispenser 100. The empty or failed disposable refill unit 101 may then be replaced with a new disposable refill unit 101. The refill unit 110 may be secured within the dispenser 100 by any means, such as, for example, a quarter turn connection, a threaded connection, a flange and fastener connection, a clamped connection, or any other reusable connection.

The liquid pump 130 and air pump 132 of the foam pump 120 are shown in FIG. 1 as separate pumps, with the liquid pump 130 being inside a pump housing 121 while the air pump 132 is disposed outside the pump housing 121. The concept of having a foam pump that has a liquid pump portion separable from an air pump portion may be referred to as a “split pump”. In a split pump configuration, one of the liquid pump 130 and air pump 132 may be included in the refill unit 101 while the other pump is attached to the housing 102 of the dispensing system 100.

The foam pump 120 combines foamable liquid 112 from the container 110 and air from the atmosphere in a premix chamber 122. The liquid pump 130 pumps foamable liquid 112 from the container 110 through a liquid inlet 114 into the premix chamber 122. Simultaneously, the air pump 132 pumps air through an air inlet 134 into the premix chamber 122. The air and liquid mixture in the premix chamber 122 flows through the foaming media 124 disposed in the outlet nozzle 126 to be dispensed as rich foam through an aperture 104 in a bottom plate 103 of the housing 102. Foaming media 124 may include screens, porous members, sponges, baffles, or the like.

The liquid pump actuator 140 includes an actuation member 142 that engages and actuates the liquid pump 130. The air pump actuator 144 includes an actuation member 146 that engages and actuates the air pump 132. In various embodiments, a single actuator may be used to actuate both the liquid pump 130 and air pump 132. Electronic actuators may additionally include a sensor (not shown) to provide for a hands-free dispenser system with touchless operation Liquid pump 130, air pump 132, and liquid and air actuators 140, 144 are generically illustrated because there are many different kinds of these components which may be employed in dispensing system 100. The liquid pump 130 may be any kind of pump, such as, for example, a diaphragm pump, a piston pump, a peristaltic pump, or the like. The air pump 132 may be any type of air pump, such as a rotary pump, a piston pump, a fan pump, a turbine pump, a pancake pump, a diaphragm pump, or the like. The actuators 140, 144 of the dispensing 100 may be any type of actuator, such as a manual lever, a manual pull bar, a manual push bar, a manual rotatable crank, an electrically activated actuator or other means for actuating liquid pump 130 and air pump 132.

The controller 150 may be any kind of electronic component, such as a processor, configured to receive an input signal from the sensor 152. In some embodiments, the controller 150 generates at least one output signal. In the illustrated embodiment, the output signal is sent to the actuators 140, 144. In other embodiments, an output signal (not shown) may be sent to a valve (not shown), an electromechanical latch, or other means of preventing the dispenser from actuating or dispensing liquid or foam. The controller 150, sensor 152, and actuators 140, 144 are shown hard wired with input signal wires 154 and output signal wires 156, though these components may be connected by any means of transmitting a signal, such as, for example, by one or more busses, printed circuits, Wi-Fi, Bluetooth, NFC, or other means of wireless communication. The controller 150 is shown in FIG. 1 inside of the housing 102, but the controller 150 may be disposed remotely from the foam pump 120 and container 110. The controller 150 and sensor 152 may be battery powered or may be wired into the electrical system of a building.

The sensor 152 senses one or more parameters associated with the integrity of the container 110. The integrity of the container 110 is breached if the container 110 is opened, cut, ruptured, etc. so that fluid may be added to the container 110. In an exemplary embodiment, the sensor 152 is a photodiode that measures the amount of light transmitted through a light transmitting portion 116 of the container 110. In some embodiments, the container 110, other than the light transmitting portion 116, is opaque to prevent the transmission of light. If the container 110 is cut, ruptured, or breached in some way an increase in light will be detected by the sensor 152. Though the sensor 152 is shown attached to a side of the container 110, in other embodiments the sensor 152 may be inserted inside the container (not shown) so that no window 116 is necessary and the sensor is able to view the interior of the container 110 directly. In still other embodiments, a light pipe may be used between the container 110 and the sensor 152 so that the sensor 152 can be placed in a location that is remote from the container 110. The light pipe may interface with the container 110 at the wall of the container 110 through a window 116, or in a coupling of the container (not shown) or otherwise so that the sensor 152 may detect an increase in light level. The light detected by the sensor 152 may be ambient light or may be generated by a light source (not shown) configured to shine on the exterior of the container 110. This configuration allows a breach in the container 110 to be detected when there is not enough ambient light to detect a breach.

During operation of the dispensing system 100, the controller 150 determines if the container 110 has been breached before dispensing any foam to the user. Breaches are detected as described above by the sensor 152. The sensor 152 transmits a signal to the controller 150. When no breach in the container 110 is detected by the sensor 152, the controller 150 allows foam to be dispensed from the dispensing system 100. In some embodiments, when a breach in the container 100 is detected, the controller 150 prevents the dispensing system 100 from dispensing foam by any means, such as, for example, closing a liquid valve (not shown) disposed before or after the liquid pump 130, preventing the actuators 140, 144 from actuating either by physically preventing actuation or not powering electrical actuators, or the like. Additionally, the controller 150 may illuminate an LED (not shown) on the exterior of the dispenser system 100 to notify a user that the container 110 has been breached and the system is potentially in an unsanitary condition. The controller 150 may even transmit a notification signal over a computer network to inform a remote user or administrator of a breach in the container 110.

In some embodiments, the controller 150 monitors the sensor 152 to detect an increase in light above a set threshold. The threshold allows some light to pass into the container 110 without indicating a breach. In addition, the sensor 152 may be set to detect certain light wavelengths that are associated with a breach. In an embodiment including a light source, the light source may be set to transmit the wavelengths of light that the sensor 152 is set to detect. In some embodiments, a lens may be used to concentrate light from within the container 110 on the sensor 152.

Figure 2:
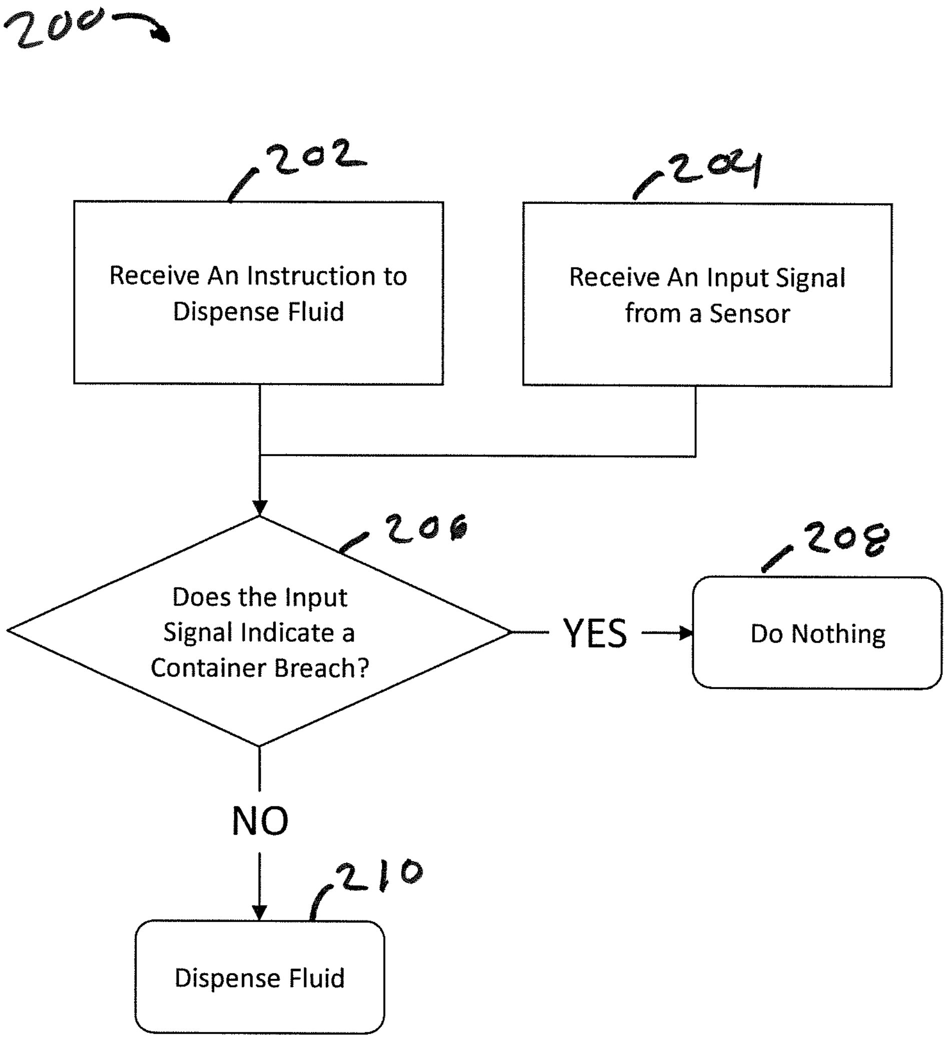
FIG. 2 is a block diagram illustrating the steps of an exemplary method for controlling a dispensing system.

FIG. 2 illustrates a exemplary embodiment of a simple methodology 200 for preventing contamination of a dispenser system due to a breach in a container. The methodology begins with receiving an instruction to dispense fluid at block 202. An input signal is received from a sensor at block 204. At block 206 a determination is made as to whether there was a breach in the integrity of the container. If there has been a breach the system does nothing at block 208 and no fluid is dispensed. If there has not been a breach in the integrity of the container, fluid is dispensed at block 210.

Figure 3:
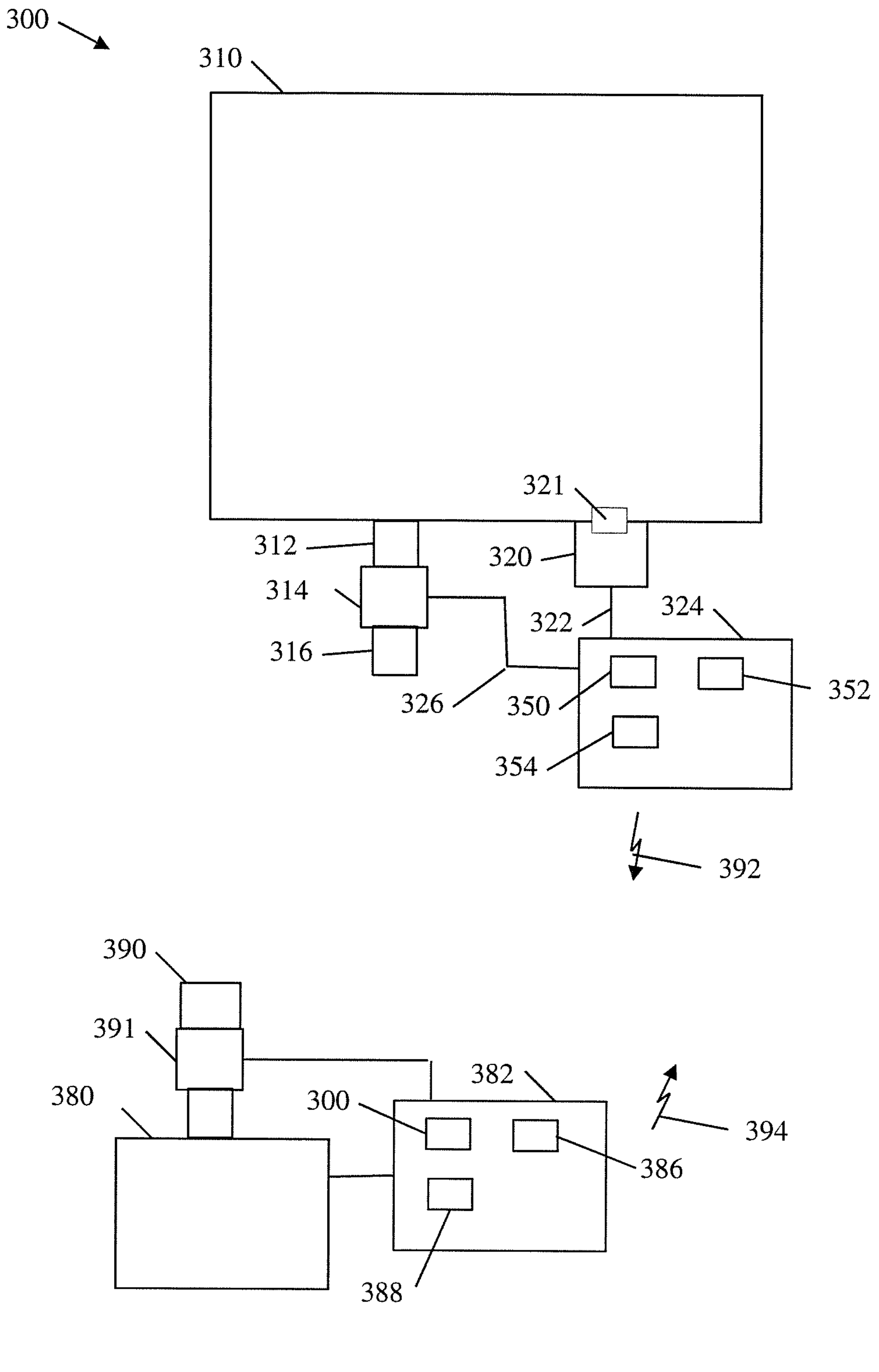
FIG. 3 is a schematic diagram of an exemplary bulk refill unit for a dispensing system.

FIG. 3 illustrates an exemplary embodiment of a bulk refill system 300. The bulk refill system 300 includes a bulk refill container 310, an outlet 312, a valve 314, a nozzle 316, sensor 320 and a refill controller 324. In some embodiments, the system includes one or more dispenser 380. The dispenser 380 includes a dispenser controller 382. In some exemplary embodiments, the dispenser includes an inlet port 390, an inlet valve 391 and a dispenser controller 382.

Bulk refill container 310 forms a liquid reservoir that contains a supply of dispensable liquid. In various embodiments, the contained liquid could be for example a soap, sanitizer, a cleanser, a disinfectant, a foamable liquid, or some other dispensable liquid. The container may include a vent (not shown) to vent the container.

Refill controller 342 includes a processor 350 and memory 352. In some embodiments, refill controller 324 includes a transceiver 354 for communicating with a dispenser controller 382 and/or a central station (not shown).

Refill controller 324 is configured to receive an input signal from the sensor 320. Refill controller 320 is also configured to provide an output signal to actuate valve 314. Valve 314 may be any type of valve capable of operating in response to a signal from refill controller 324, such as, for example, a solenoid valve, and eclectically operated ball valve, or the like.

The refill controller 324, sensor 320, and valve 314 are shown hard wired however, these components may be connected by any means of transmitting a signal, such as, for example, by one or more busses, printed circuits, Wi-Fi, Bluetooth, NFC, or other means of wireless communication. Refill controller 324 and sensor 320 may be battery powered or may be wired into the electrical system of a building.

The sensor 320 senses one or more parameters associated with the integrity of the container 310. The integrity of the container 310 is breached if the container 310 is opened, cut, ruptured, etc. so that fluid may be added to the container 310. In some embodiment sensor 320 continuously monitors the integrity of bulk refill container 310. In some embodiment, the monitoring is intermittent. In some embodiments, monitoring of the container is based on another condition, such as for example, motion, vibration, noise, shock, or the like.

In an exemplary embodiment, the sensor 320 is a photodiode that measures the amount of light transmitted through a light transmitting portion 321 of the container 310. In some embodiments, the bulk refill container 310, other than the light transmitting portion 321, is opaque to prevent the transmission of light. If the bulk refill container 310 is cut, ruptured, or breached in some way an increase in light will be detected by the sensor 321. Though the sensor 320 is shown attached to a side of the bulk refill container 310, in other embodiments the sensor 321 may be inserted inside the container (not shown) so that no window 321 is necessary and the sensor is able to view the interior of the container 310 directly. In still other embodiments, a light pipe may be used between the bulk refill container 310 and the sensor 321 so that the sensor 321 can be placed in a location that is remote from the bulk refill container 310. The light pipe may interface with the bulk refill container 310 at the wall of the container 310 through a window 321, or in a coupling of the container (not shown) or otherwise so that the sensor 321 may detect an increase in light level. The light detected by the sensor 320 may be ambient light or may be generated by a light source (not shown) configured to shine on the exterior of the bulk refill container 321. This configuration allows a breach in the bulk refill container 310 to be detected when there is not enough ambient light to detect a breach. Sensor 320, the controller for valve 314, memory 352, transceiver 354 are in circuit communication with one another.

During operation of the bulk refill system 300, the refill controller 324 determines if the bulk refill container 310 has been breached before transmitting a signal that causes valve 314 to open. In some embodiments, additional requirements are included before valve 314 is caused to open, such as to, for example, insuring that outlet nozzle 316 is inserted in an inlet 390 of a dispenser system. Breaches are detected as described above by the sensor 321. The sensor 321 transmits a signal to the controller 324. When no breach in the container 310 is detected by the sensor 321, the controller 324 allows liquid to be dispensed from the bulk refill system 300. Additionally, the controller 324 may illuminate an LED (not shown) to notify a user that the container 310 has been breached and the system is potentially in an unsanitary condition. The controller 324 may even transmit a notification signal over a computer network to inform a remote user or administrator of a breach in the container 310.

In some embodiments, the controller 324 monitors the sensor 320 to detect an increase in light above a set threshold. The threshold allows some light to pass into the container 310 without indicating a breach. In addition, the sensor 321 may be set to detect certain light wavelengths that are associated with a breach. In an embodiment including a light source, the light source may be set to transmit the wavelengths of light that the sensor 320 is set to detect. In some embodiments, a lens may be used to concentrate light from within the container 310 on the sensor 321.

In some embodiments bulk refill system 300 includes one or more dispensers 380. Dispensers 380 include a valve 391, outlet nozzle 390 and dispenser controller 382. Dispenser controller 382 includes a processor 384, memory 388 and in some embodiments, transceiver 394. Processor 384, controller for valve 391, memory 388, transceiver 386 are in circuit communication with one another.

In some embodiments, refill controller 324 transmits a signal 392 to dispenser controller 382. In some embodiments, signal 392 is a signal indicating that there has been no breach in the integrity of container 310. In some embodiments, signal 392 includes an information indicative of the identity of the bulk refill container 310. In some embodiments, if there has not been a breach in container 310, dispenser controller 382 will send a signal to open valve 391 and allow fluid to flow in from outlet nozzle 316 of bulk refill container 310.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Moreover, elements described with one embodiment may be readily adapted for use with other embodiments. Therefore, the invention, in its broader aspects, is not limited to the specific details, the representative apparatus and illustrative examples shown and described. Accordingly, departures may be made from such details without departing from the spirit or scope of the applicants' general inventive concept.

What is claimed is:

1. A bulk refill system comprising:

a refill container for holding a liquid to be dispensed;

wherein the refill container is sealed from the outside environment;

a sensor for sensing the container has been breached, wherein the sensor senses one of an increase in light being let into the container, vibration, noise, or shock;

refill communication circuitry; and an outlet port on the refill container;

one or more soap or sanitizer dispensers configured to be refilled by the refill container;

the one or more soap or sanitizer dispensers having an inlet port configured to mate with the outlet port on the refill container;

a dispenser controller;

dispenser communication circuitry for communicating with the refill communication circuitry;

wherein the refill communications circuitry transmits a signal to the dispenser controller indicative of whether the refill container has been breached; and wherein the dispenser controller allows fluid to flow into the dispenser if the dispenser controller has not received one or more signals indicative of a breach.

2. The bulk refill system of claim 1 further comprising an electronically controllable valve.

3. The bulk refill system of claim 1 further comprising a second electronically controllable valve wherein the second electronically controllable valve is on the refill container.

4. The bulk refill system of claim 1 wherein the refill container is opaque and the sensor senses an increase in light within the refill container.

5. The bulk refill system of claim 1 wherein the sensor is located at least partially within the refill container.

6. The bulk refill system of claim 1 wherein the refill communication circuitry and the dispenser communication circuitry are wireless communications circuitry.

7. A method for controlling fluid flow to a dispensing system comprising:

providing a refill container having a sensor for sensing a breach of the refill container;

a refill controller for receiving one or more signals from the sensor;

refill container communications circuitry for communicating one or more signals; and an outlet nozzle;

providing a soap or sanitizer dispenser having an inlet port for connecting to the outlet nozzle;

a dispenser container;

a conduit between the inlet port and the dispenser container;

a fluid flow control device configured to allow fluid to flow into the dispenser container or prevent fluid from flowing into the dispenser container;

the fluid flow control device located in the conduit between the inlet port and the dispenser container;

a dispenser controller;

dispenser communications circuitry for receiving the one or more signals;

connecting the outlet nozzle to the inlet port;

receiving a signal from the refill communications circuitry by the dispenser communications circuitry;

causing the fluid control device to allow fluid to flow into the dispenser container if the signal is indicative of the refill container not having been breached and not causing the fluid flow control device to allow fluid to flow into the container if the signal is indicative of the refill container having been breached.

8. The method of claim 7 wherein the fluid flow control device is an electronically controllable valve.

9. The method of claim 7 wherein the sensor senses one of an increase in light being let into the container, vibration, noise or shock.

10. The method of claim 7 wherein the sensor senses light.

11. The method of claim 7 wherein the refill communications circuitry and the dispenser communications circuitry comprises wireless communication circuitry.

12. The method of claim 7 further comprising transmitting a notification signal of a breach to a central computer to notify of a breach of the integrity of the refill container.

13. The method of claim 7 further comprising a refill container valve and wherein the refill container valve is controllable by the refill controller and wherein the refill container valve is opened if no breach of the integrity of the refill container is detected and is not opened if a breach of the integrity of the refill container is detected.

14. A bulk refill system comprising:

a refill container for holding a liquid to be dispensed;

wherein the refill container is opaque;

wherein the refill container is sealed from the outside environment;

a sensor for sensing an increase in light in the container;

a refill controller configured to receive one or more signals from the sensor indicative of an increase in light; and circuitry for transmitting one or more signals to a dispenser controller;

wherein the refill controller transmits a signal to allow fluid to flow if the refill controller has not received one or more signals indicative of an increase in light.

15. The bulk refill system of claim 14, further comprising an electronically controllable valve.

16. The bulk refill system of claim 14, further comprising a soap or sanitizer dispenser, the soap or sanitizer dispenser having a dispenser controller and flow control device, and wherein the dispenser controller energizes the flow control device if it receives a signal that is indicative of no increase in light detected by the sensor.

17. The bulk refill system of claim 14, further comprising electronically controllable refill valve wherein the electronically controllable refill valve is on the refill container.

18. The bulk refill system of claim 14 wherein the sensor is located proximate a translucent window on the refill container.

19. The bulk refill system of claim 14 further comprising a light pipe for directing light from inside the refill container to the light sensor.

20. The bulk refill system of claim 16 further comprising circuitry for transmitting a signal to a remote computer that the refill container has been breached.

* * * * *